United States Patent [19]
Vaughn

[11] 3,720,333
[45] March 13, 1973

[54] MOTORCYCLE CARRIER

[76] Inventor: Jacard M. Vaughn, 1709 Lynn Grove Dr., Manhattan Beach, Calif. 90266

[22] Filed: Dec. 29, 1970

[21] Appl. No.: 102,334

[52] U.S. Cl..............................214/450, 224/42.03
[51] Int. Cl.................................................B60r 9/00
[58] Field of Search.......214/505, 85, 85.1, 450, 451, 214/454; 224/42.03 R, 42.03 B

[56] References Cited

UNITED STATES PATENTS

| | | | |
|---|---|---|---|
| 3,348,713 | 10/1967 | Will | 214/450 |
| 3,056,520 | 10/1962 | Rutigliano | 214/505 |
| 3,586,188 | 6/1971 | Cambell | 214/450 |
| 2,631,806 | 3/1953 | Harder | 224/42.03 R |
| 2,409,395 | 10/1946 | Schwinn | 224/42.03 B |

*Primary Examiner*—Robert G. Sheridan
*Assistant Examiner*—John Mannix
*Attorney*—Clarence A. O'Brien and Harvey B. Jacobson

[57] ABSTRACT

A support, loading and unloading ramp and trailer combination for mounting on the rear or other peripheral portion of a motor vehicle and operable to support a two wheeled vehicle therefrom in elevated position above the ground, load and unload a two wheeled vehicle relative to the supporting vehicle and couple to the rear of the two wheeled vehicle for twoing therebehind. The support includes three mounting brackets for semipermanent support from points spaced along a peripheral portion of a supporting vehicle and a ramp removably anchored at its opposite ends to the remote supports and pivotally supported from the intermediate support for oscillation about a horizontal transverse axis.

11 Claims, 8 Drawing Figures

PATENTED MAR 13 1973

Jacard M. Vaughn
INVENTOR.

BY Clarence A. O'Brien
and Harvey B. Jacobson
Attorneys

Jacard M. Vaughn
INVENTOR.

BY Clarence A. O'Brien
and Harvey B. Jacobson
Attorneys

Jacard M. Vaughn
INVENTOR.

MOTORCYCLE CARRIER

The motorcycle carrier of the instant invention includes three mounting bracket portions for support from transversely spaced portions of the rear end of a motor vehicle and an elongated motorcycle supporting ramp including structure at its opposite ends for removable attachment to the remote vehicle mounting supports and with the central portion of the ramp oscillatably supported from the center motor vehicle mounted support for oscillation about a horizontal axis extending transversely of the ramp. In addition, the ramp is constructed in a manner whereby it may be wholly removed from the associated motor vehicle and provided with wheeled running gear for use as a trailer to be towed behind a motorcycle equipped with a suitable tow bar.

The motorcycle carrier of the instant invention has been primarily designed for use by persons wishing to transport motorcycles to remote locations of use by means of conventional motorcycles and who then wish to utilize their motorcycles for off-the-road travel, either with or without benefit of a trailer being towed therebehind for carrying equipment too bulky to be supported from the motorcycle itself.

It is therefore the main object of this invention to provide a motorcycle carrier constructed in a manner which will enable a motorcycle to be readily mounted upon and unloaded from the rear end of a motor vehicle such as a pick-up truck.

Another object of this invention, in accordance with the immediately preceding object, is to provide a motorcycle carrier constructed in a manner which will enable even the heaviest motorcycles to be readily loaded on and unloaded from motor vehicles.

Still another object of this invention is to provide a motorcycle carrier including a major component thereof adapted to be equipped with wheeled running gear and subsequently utilized as a trailer for towing behind the motorcycle previously supported from the motorcycle carrier on the rear of the vehicle.

A final object of this invention to be specifically enumerated herein is to provide a motorcycle carrier which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
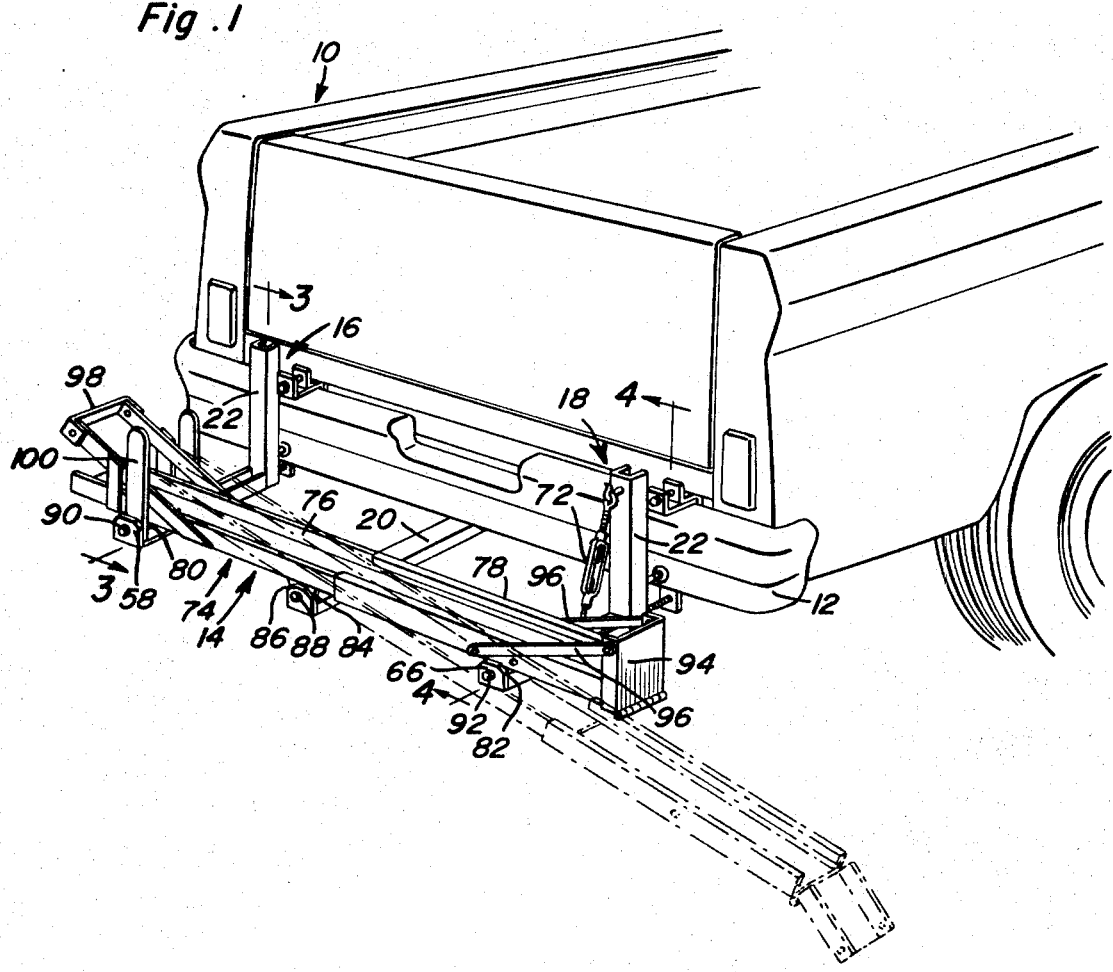
FIG. 1 is a perspective view of the motorcycle carrier of the instant invention illustrated mounted upon the rear end of a pick-up truck and with an alternate position of the motorcycle supporting portion of the carrier illustrated in phantom lines and defining a loading and unloading ramp.
Figure 5:
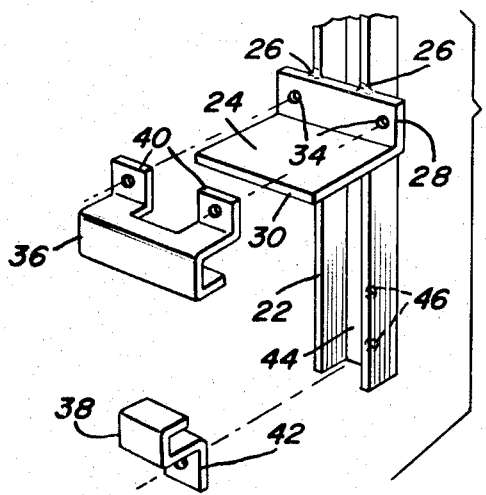
FIG. 5 is a fragmentary exploded perspective view of the clamp structure of one of the opposite end supports mounted on the bumper of the associated vehicle.
Figure 2:
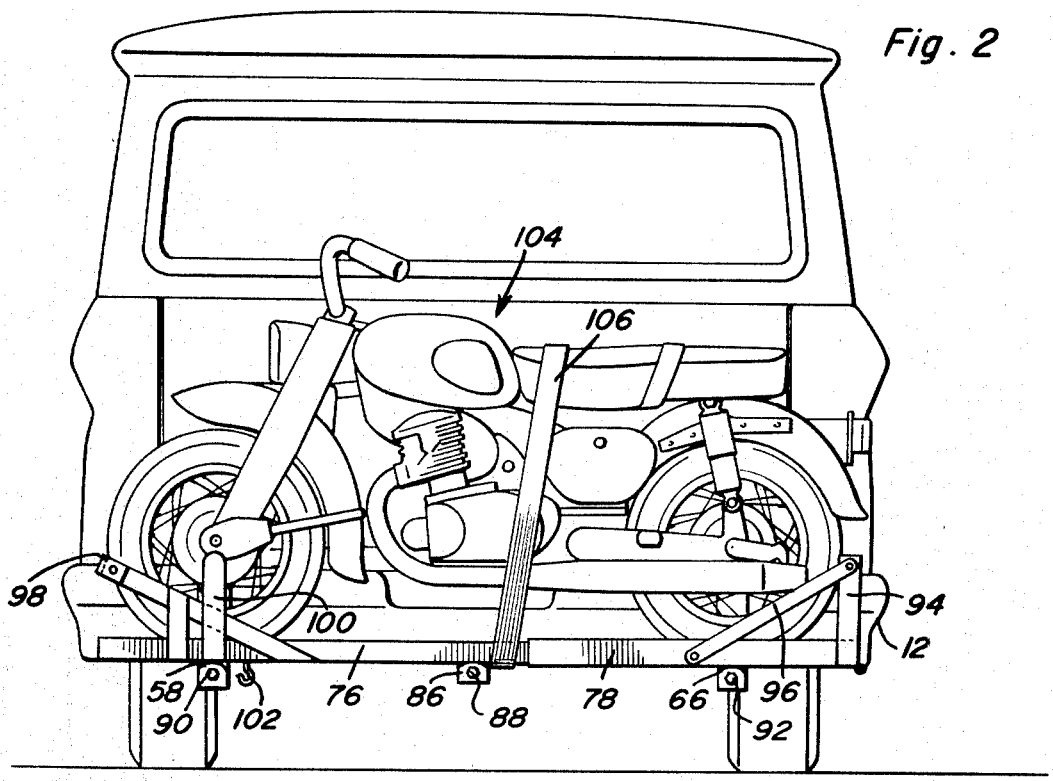
FIG. 2 is a rear elevational view of the pick-up truck with the motorcycle carrier supported thereon and in use supporting a motorcycle therefrom.

Referring now more specifically to the drawings, the numeral 10 generally designates a conventional form of pick-up truck including a rear transverse bumper 12. The motorcycle carrier of the instant invention is referred to in general by the reference numeral 14 and includes a pair of similar bumper mounted brackets referred to in general by the reference numerals 16 and 18 and a frame mounted bracket 20 which may also enjoy a connection (not shown) with the bumper 12, if desired.

Each of the brackets 16 and 18 includes an upstanding channel shaped standard 22 having an L-shaped mounting bracket 24 secured to its upper portion by welding as at 26. Each mounting bracket 24 includes an upstanding flange portion 28 which is secured to the standard 22 by the welding 26 and a forwardly projecting horizontal flange portion 30 adapted to overlie the upper surface of the bumper 12. The opposite ends of the flange portions 28 project beyond the opposite sides of the corresponding standards 22 and are apertured as at 34. In addition, each of the standards 22 includes upper and lower J-shaped brackets 36 and 38 including right angled vertical apertured flanges 40 and 42, respectively, and the lower end portion of the bight portion 44 of each standard 22 is provided with a pair of vertically spaced apertures 46.

Figure 4:
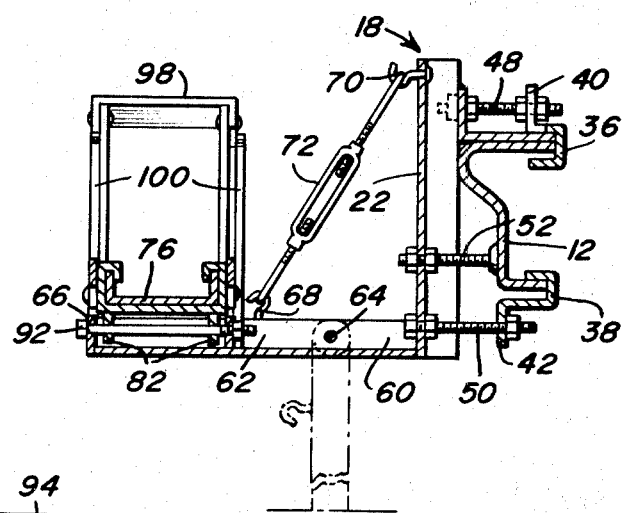
FIG. 4 is an enlarged fragmentary vertical sectional view taken substantially upon a plane indicated by section line 4—4 of FIG. 1.
Figure 3:
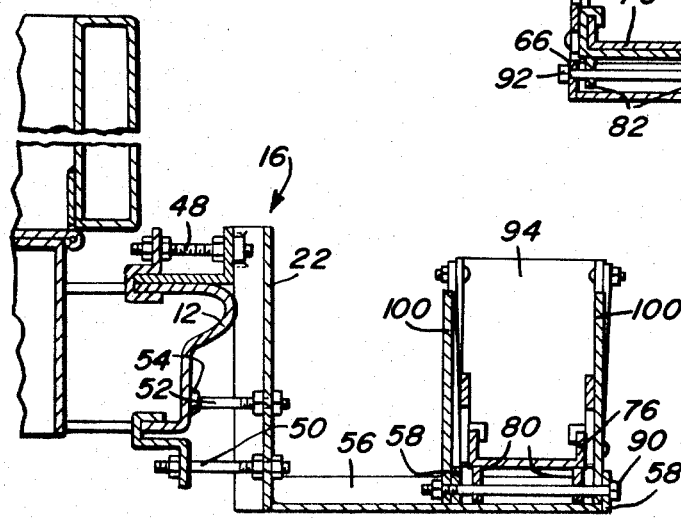
FIG. 3 is an enlarged fragmentary vertical sectional view taken substantially upon a plane indicated by the section line 3—3 of FIG. 1.

The J-shaped mounting brackets 36 engage over the upper lip of the bumper 12 in the manner indicated in FIGS. 3 and 4 of the drawings and the J-shaped mounting brackets 38 engage under the lower lip of the bumper 12 in the manner illustrated in FIGS. 3 and 4 of the drawings. A pair of fasteners 48 are secured through each pair of apertures 34 in the corresponding apertured flanges 40 and a single fastener 50 is secured through each flange 42 and the lower corresponding aperture 46. In addition, an abutment type fastener 52 is secured through each upper aperture 46 and includes a head 54 on its forward end abutted against the opposing rear face of the bumper 12. In this manner, the brackets 16 and 18 are securely fastened to the bumper 12.

With attention now invited more specifically to FIGS. 1 and 3 of drawings, it may be seen that the lower end of the standard 22 of the bracket 16 includes a rearwardly directed horizontal channel shaped arm 56 whose forward end is secured to the lower end of that standard 22 in any convenient manner such as by welding. The rear end portion of the arm 56 includes a pair of upstanding apertured mounting ears 58 spaced therealong. Further, the lower end of the standard 22 of the bracket 18 includes a short rearwardly directed arm 60 having an extension 62 pivotally secured thereto as at 64 for swinging between a horizontal rearwardly directed position such as that illustrated in FIG. 4 of the drawings and a depending position such as that illustrated in phantom lines in FIG. 4. The extension 62 also includes longitudinally spaced upstanding apertured mounting ears similar to the mounting ears 58 and designated by the reference numeral 66. In addition, the extension 62 includes a hook 68 while the upper end of the corresponding standard 22 includes a similar hook 70 and an adjustable length turn bucket 72 is removably connected between the hooks 68 and 70 for releasably retaining the extension 62 in the horizontally rearwardly directed position thereof illustrated in FIG. 4 of the drawings.

With reference now more specifically to FIGS. 1 through 4 of the drawings, there may be seen an elongated ramp structure referred to in general by the reference numeral 74 and including first and second sections 76 and 78 telescopingly joined together. Each of the sections 76 and 78 comprises a channel member and the section 78 is telescoped over the adjacent end of the section 76 for extension and retraction relative thereto. The remote ends of the sections 76 and 78 include downwardly directed opposite side apertured mounting ears 80 and 82, respectively, and the end of the section 76 adjacent the section 78 includes similar opposite side depending apertured mounting ears 84. The ears 80 are received between and registered with the ears 58 and the ears 82 are received between and registered with the ears 66. Further, the ears 84 are received between and registered with a pair of apertured mounting ears 86 spaced along and projecting upwardly from the rear end of the brace 20. A pivot fastener 88 is secured through the apertured ears 84 and 86 whereby the ramp 74 is supported from the brace 20 for oscillation relative thereto and a fastener 90 may be secured through the apertured ears 58 and 80 in order to anchor the left end of the ramp 74 to the arm 56. Further, a fastener 92 may be secured through the apertured ears 66 and 82 in order to secure the section 78 to the extension 62.

The end of the section 78 remote from the section 76 includes a pivoted ramp 94 and opposite side connecting links 96 are secured between the free end of the ramp 94 and the opposite sides of the section 78 in order to releasably retain the ramp 94 in an upwardly directed position. Further, the end of the section 76 remote from the section 78 includes an abutment 98 supported therefrom for engagement with the adjacent wheel of an associated motorcycle and the apertured mounting ears 58 include upwardly projecting guide straps 100 for receiving the adjacent end of the section 76 therebetween. Also, the section 76 includes a hook 102 to which one end of a link chain section (not shown) may be engaged with the other end of the link chain section engaged with the fastener 90 to limit upward swinging movement of the adjacent end of the ramp 74.

In operation, when it is desired to load a motorcycle such as the motorcycle referred to in general by the reference numeral 104 on the carrier 14, the ramp 94 may be released and the turn buckle 72 may be removed together with the fastener 92. Then, the extension 62 is free to pivot toward the depending position thereof illustrated in phantom lines in FIG. 4 of the drawings. Thereafter, the fastener 90 may be removed and the aforementioned link chain may be connected between the hook 102 and the arm 56 or the fastener 90 after it is subsequently replaced and the ramp 74 may have its right end swung downward toward the ground after the section 78 has been extended relative to the section 76. In this manner, the ramp 74 will define an upwardly inclined ramp along which the motorcycle 104 may be rolled until the center of gravity of the motorcycle 104 is disposed past the axis of oscillation of the ramp 74 defined by the pivot fastener 88 whereupon the left end of the ramp 74 will swing downward into engagement with the arm 56 and may be secured in position by means of the fastener 90. Thereafter, the section 78 may be telescoped more fully onto the section 76 and secured in position by means of the fastener 92 after which the connecting links 96 may again be utilized to secure the ramp 94 in the upwardly directed position thereof illustrated in FIGS. 1 and 2 of the drawings behind the rear wheel of the motorcycle 104. Additionally, in order to more securely fasten the motorcycle 104 to the motorcycle carrier 14, a strap of the adjustable length type and designated by the reference numeral 106 may be utilized to encircle not only the motorcycle 104 but also the ramp 74.

Figure 6:
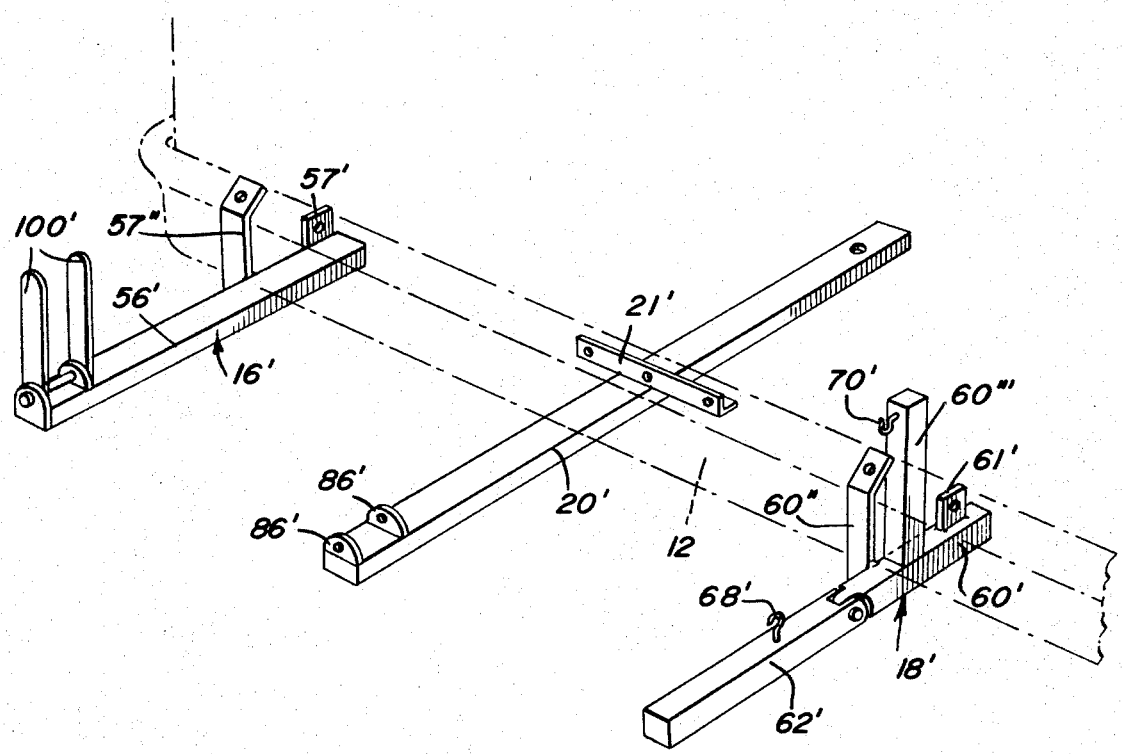
FIG. 6 is a perspective view of a modified form of mounting structure.
Figure 7:
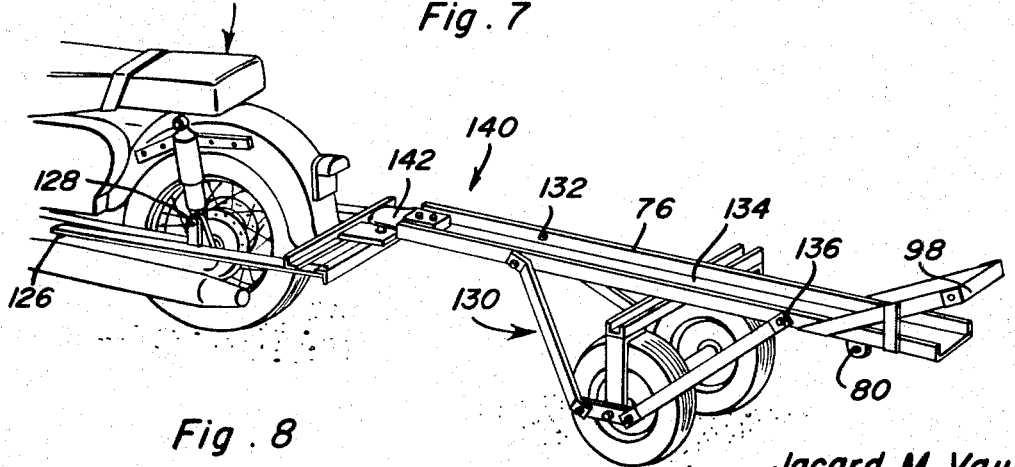
FIG. 7 is a perspective view of the rear end of a motorcycle having a tow bar mounted thereon to which a trailer utilizing the ramp portion of the motorcycle carrier as its body is coupled.

With attention now invited more specifically to FIG. 6 of the drawings, there may be seen three mounting brackets which are similar to the brackets 16, 18 and 20 and which are therefore designated by corresponding prime reference numerals. The bracket 20' includes an intermediate cross brace 21' which may be secured to any suitable frame member of the vehicle 10 and the arms 56' and 60' of the brackets 16' and 18' include forward extensions having upstanding apertured mounting flanges 57' and 61', respectively, secured thereto which may be in turn removably anchored to the bumper mounting arms (not shown) for the bumper 12. Also, the arms 56' and 60' include upwardly projecting apertured mounting straps 57'' and 60'' for disposition behind and securement to the upper marginal edge portion of the bumper 12 by means of removable fasteners. However, the arm 60' includes an upstanding post 60''' provided with a hook 70' similar to the hook 70 while the extension 62' or the arm 60' includes a hook 68' corresponding to the hook 68. In addition, the outer end of the extension 62' does not include apertured mounting ears or flanges corresponding to the components 66 and, if desired, the latter may also be, together with the apertured mounting ears 82, removed from the extension 62 and the section 78 as long as some other means (not shown) is provided for preventing extension of the section 78 relative to the section 76.

Figure 8:
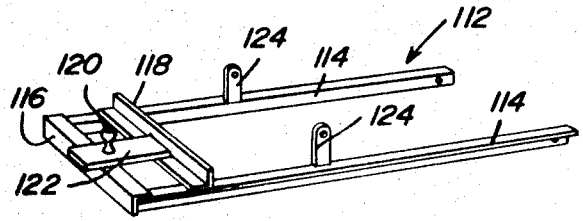
FIG. 8 is a perspective view of the motorcycle tow bar.

With attention now invited more specifically to FIG. 8 of the drawings, there may be seen a motorcycle tow hitch referred to in general by the reference numeral 112 comprising a pair of support arms 114 which generally parallel each other and are interconnected at one pair of corresponding ends by means of a pair of transverse members 116 and 118. A ball hitch element 120 is carried by a support plate 122 securely fastened between the midportions of the transverse members 116 and 118 and each of the arms 114 includes an upwardly extending apertured mounting ear 124 centrally intermediate its opposite ends. The forward ends of the arms 114 are secured to opposite side portions of the motorcycle 104 by means of suitable fasteners 126 and the mounting ears 124 are secured to opposite side lower shock absorber mounts of the motorcycle 104 by means of fasteners 128.

After the motorcycle 104 has been removed from the carrier 144, the ramp 74 may be removed and the section 76 thereof may have a wheeled running gear assembly referred to in general by the reference numeral 130 removably secured thereto by means of suitable fasteners 132, 134 and 136 in order to form a trailer referred to in general by the reference numeral 140 and utilizing the left end of the section 76 at its rear end and the right end of the section 76 as its forward end. However, a conventional trailer ball socket assembly 142 is removably secured to the end of the section 76 removed from telescopic engagement with the section 78 whereby the trailer 140 may be readily coupled to the ball element 120.

After the trailer 140 has thus been formed by the addition of the running gear 130 to the section 76 and coupled behind the motorcycle 104, the trailer 140 may be utilized to trail bulky or heavy camping equipment behind the motorcycle 104.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination with a vehicle, a motorcycle carrier comprising first and second supports mounted in generally horizontally aligned and spaced apart locations along one marginal portion of said vehicle, an elongated support member, means pivotally supporting said support member from one of said supports for oscillation about a horizontal axis extending transversely of said support member and a line extending between said supports with one end of said support member being disposed closely adjacent the other of said supports, said support member and said other support including means operative to releasably support said one end of said support member from said other support, said other support including a supporting arm portion projecting horizontally outwardly from said marginal portion and having an inner end portion pivotally anchored relative to said marginal portion for oscillation between a first position with said arm portion generally horizontally disposed and underlying said one end of said elongated support member when the latter is horizontally disposed and a second position with the free end of said arm portion swung downwardly and inwardly through an upstanding plane through which said one end of said elongated support member is swingable, said second support including means releasably securing said arm portion in said first position.

2. The combination of claim 1 wherein said one end of said support member includes a lengthwise extendable elongated extension section guidingly supported therefrom for longitudinal extension and retraction relative thereto.

3. The combination of claim 1 wherein said support member comprises an upwardly opening channel member.

4. The combination of claim 1 wherein the first mentioned means includes means releasably pivotally securing said support member to said one support wheeled running gear removably attachable to said support member and a hitch element removably attachable to one end of said support member.

5. The combination of claim 1 wherein said one marginal portion of said vehicle includes a bumper extending therealong, said other support being supported entirely from said bumper.

6. The combination of claim 1 wherein said one marginal portion of said vehicle includes a bumper extending therealong and bumper supports from which said bumper is supported, said other support being supported partly from said bumper and partly from said bumper supports.

7. The combination of claim 1 wherein said one marginal portion of said vehicle includes a bumper extending therealong, said other support including an upstanding member abutted against the outer face of said bumper, said bumper being channel shaped and including upper and lower marginal flanges extending therealong and extending toward said marginal portion of said vehicle, a pair of upper and lower hook type brackets engaged over the free edge portions of said upper nd lower flanges, and adjustable tension members means connected to and extending between said brackets and corresponding vertically spaced portions of said upstanding member.

8. In combination with a vehicle, a motorcycle carrier comprising first and second supports mounted in generally horizontally aligned and spaced apart locations along one marginal portion of said vehicle, an elongated support member, means pivotally supporting said support member from one of said supports for oscillation about a horizontal axis extending transversely of said support member and a line extending between said supports with one end of said support member being disposed closely adjacent the other of said supports, said support member and said other support including means operative to releasably support said one end of said support member from said other support, a third support, means supporting said third support from said vehicle marginal portion on the side of said one support remote from the other support for downward and inward swinging of said third support relative to said marginal portion from a horizontal operative position projecting outwardly from said marginal portion to a lowered inwardly retracted position, the other end of said support member, when the latter is horizontally disposed, overlying said third support member when the latter is in said operative position, said third support including upwardly facing abutment surface means with which the other end of said support member is engageable to limit downward swinging of said other end of said support member relative to said third support, means releasably anchoring said other end of said support member to said third support.

9. The combination of claim 8 wherein the other end of said support member includes an upwardly projecting wheel stop.

10. The combination of claim 8 wherein said one end of said support member includes a wheel stop shiftable between an upwardly projecting position and a slightly endwise outwardly and downwardly inclined ramp extension defining portion.

11. In combination with a vehicle, a motorcycle carrier comprising first and second supports mounted in generally horizontally aligned and spaced apart locations along one marginal portion of said vehicle, an elongated support member, means pivotally supporting said support member from one of said supports for oscillation about a horizontal axis extending transversely of said support member and a line extending between said supports with one end of said support member being disposed closely adjacent the other of said supports, said support member and said other support including means operative to releasably support said one end of said support member from said other support, said one marginal portion of said vehicle including a bumper extending therealong, said other support including an upstanding member abutted against the outer face of said bumper, said bumper being channel shaped and including upper and lower marginal flanges extending therealong and extending toward said marginal portion of said vehicle, a pair of upper and lower hook type brackets engaged over the free edge portions of said upper and lower flanges, and adjustable tension member means connected to and extending between said brackets and corresponding vertically spaced portions of said upstanding member, an adjustable length elongated abutment member having one end supported from said upstanding member between said spaced portions of said upstanding member and the other end abutted against the outer face of said bumper.

* * * * *